United States Patent Office 2,782,199
Patented Feb. 19, 1957

2,782,199

TROPINE ESTER OF XANTHENE-9-CARBOXYLIC ACID AND SALTS THEREOF

John W. Cusic, Skokie, Ill., assignor, by mesne assignments, to G. D. Searle & Co., Skokie, Ill., a corporation of Delaware No Drawing. Application January 13, 1954,
Serial No. 403,909

4 Claims. (Cl. 260—292)

The present invention relates to new ester of xanthene-9-carboxylic acid and, more specifically, to the tropine ester of xanthene-9-carboxylic acid of the structural formula

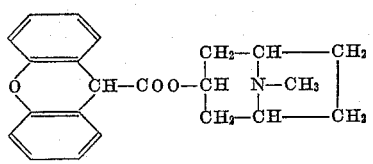

and its non-toxic acid addition and quaternary salts.

The basic ester of the foregoing structural formula forms salts which are non-toxic in therapeutic dosage with a variety of inorganic and strong organic acids including sulfuric, phosphoric, hydrochloric, hydrobromic, sulfamic, citric, ascorbic and related acids. It also forms quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, bromobenzyl bromide, dimethyl sulfate, diethyl sulfate, methyl benzenesulfonate, ethyl toluenesulfonate, ethylene chlorohydrin, propylene chlorohydrin, allyl bromide, methallyl bromide, and crotyl bromide.

The new type of ester described herein and its salts possess a number of highly useful pharmacodynamic properties. With a minimum of side effects, they produce a potent antagonism against acetylcholine and a strong cardiovascular effect. They are powerful spasmolytics and ganglion blocking agents. Further, they are potent hypotensive agents.

My invention will be described more fully in combination with the following examples. It should be understood, however, that these are given by way of illustration only and that the invention is not to be construed as limited in spirit or in scope by the details set forth. It will be apparent to those skilled in the art that many related salts of the ester described can be prepared by analogous means without departing from the invention. In the examples, temperatures are given uncorrected in degrees centigrade (° C.) and quantities of materials in parts by weight.

Example 1

A mixture of 260 parts of xanthene-9-carboxylic acid chloride, 141 parts of tropine and 800 parts of butanone is maintained at 60° C. for 4 hours and then cooled. The resulting precipitate is collected on a filter and dissolved in water. The clear aqueous solution is washed with ether and rendered alkaline by addition of ammonium hydroxide. The tropine ester of xanthene-9-carboxylic acid separates as an oil. It is dissolved in a mixture of benzene and ether. The solution is dried over anhydrous potassium carbonate, filtered and evaporated. The residual oil is dissolved in acetone and treated with one equivalent of a 25% solution of hydrogen chloride in isopropanol. After standing for 15 minutes, the hydrochloride of the tropine ester of xanthene-9-carboxylic acid is obtained which melts at about 248–249° C.

Example 2

To a solution of 69 parts of the tropine ester of xanthene-9-carboxylic acid in 240 parts of acetone are added 52 parts of bromomethane. A solid precipitate forms almost instantly. The methobromide of the tropine ester of xanthene-9-carboxylic acid thus obtained melts at about 276–277° C.

Example 3

Upon addition of 7 parts of iodomethane to a solution of 7 parts of the tropine ester of xanthene-9-carboxylic acid in 24 parts of acetone there occurs an almost immediate precipitation of the crystalline methiodide melting at about 257–258° C.

I claim:

1. A member of the class consisting of the tropine ester of xanthene-9-carboxylic acid and the non-toxic salts thereof.
2. The tropine ester of xanthene-9-carboxylic acid.
3. The hydrochloride of the tropine ester of xanthene-9-carboxylic acid.
4. A methohalide of the tropine ester of xanthene-9-carboxylic acid.

References Cited in the file of this patent

UNITED STATES PATENTS

| | | |
|---|---|---|
| 2,143,491 | Miescher | Jan. 10, 1939 |
| 2,221,828 | Wolfes et al. | Nov. 19, 1940 |
| 2,334,310 | Burtner | Nov. 16, 1943 |
| 2,512,307 | Clinton et al. | June 20, 1950 |
| 2,607,777 | Burtner | Aug. 19, 1952 |

OTHER REFERENCES

Cusic: J. Org. Chem., 16:1922 and 1924 (1951).